Oct. 6, 1936.  G. G. HARRINGTON  2,056,319

DRILL BIT

Filed Dec. 11, 1933

George G. Harrington
INVENTOR.

BY
ATTORNEY.

Patented Oct. 6, 1936

2,056,319

UNITED STATES PATENT OFFICE 2,056,319

DRILL BIT

George G. Harrington, Houston, Tex., assignor to Reed Roller Bit Company, Houston, Tex., a corporation of Texas Application December 11, 1933, Serial No. 701,876

3 Claims. (Cl. 255—61)

This invention relates generally to deep well drilling apparatus and specifically to drill bits.

It has for its general object the provision of a new and improved fish tail bit of the removable blade type.

A specific object of the invention is to provide a bit of said type in which the blades are welded to the head, the construction of the head and blades being such that the recesses for the reception of the welding material are readily accessible so that the welding material may be quickly and easily applied and by a blow torch removed; the parts being so constructed that the blades are strongly supported by the head and securely held thereon by the welding material.

In drills of this type muddy water known as slush is pumped down through the drill stem and bit to the cutters to keep them cool and remove the cuttings thereof, and this invention has for another of its specific objects to provide a new and improved construction to direct the slush to the cutters.

Figure 1:
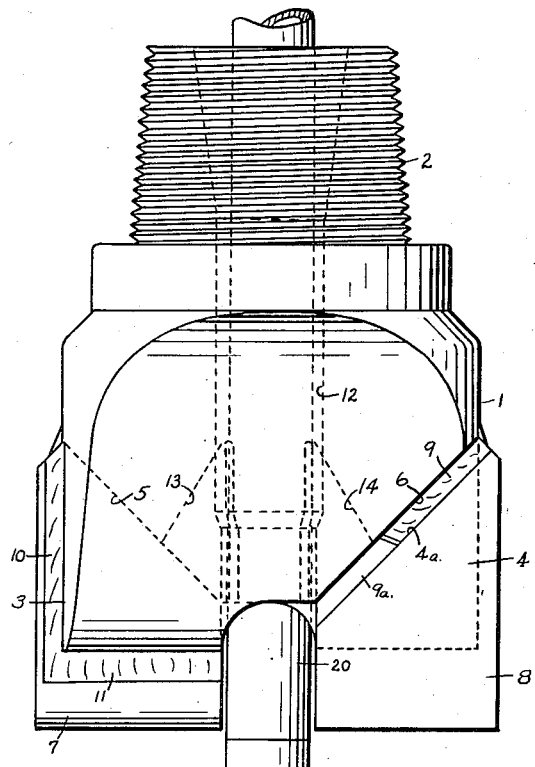
Figure 2:
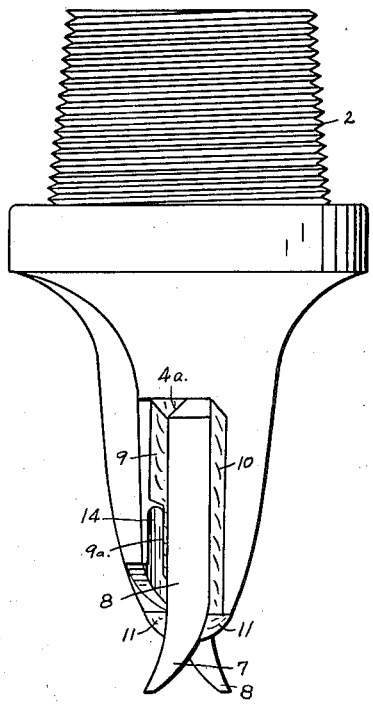
Figure 3:
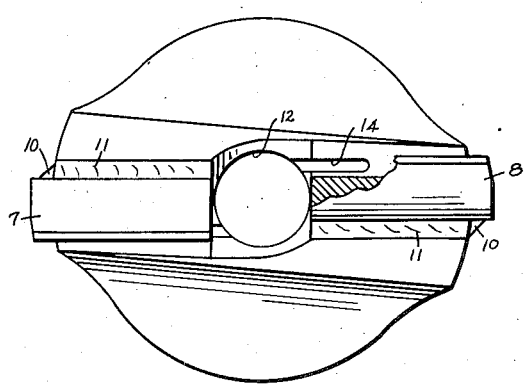

Two preferred embodiments of the invention are illustrated by the accompanying drawing in which Fig. 1 is an elevation of a bit particularly adapted for core drilling; Fig. 2, a view of the bit shown by Fig. 1 taken at a right angle thereto; Fig. 3, a bottom plan view of said bit with a portion broken away; and Fig. 4, a reduced elevation of another bit adapted for drilling without coring. In Figs. 2 and 3, the core barrel of Fig. 1 is omitted.

Referring first to Figs. 1, 2, and 3, the bit head is indicated at 1. It has the threaded shank 2 whereby it may be connected to the lower end of a drill stem not shown.

The bit head has oppositely disposed depending bearing projections 3 and 4, and shoulders 5 and 6 extending upwardly and outwardly substantially from the longitudinal axis of the head to the periphery thereof. The blades 7 and 8 bear upon the projections 3 and 4 and the shoulders 5 and 6 respectively and their inner front portions are beveled (see 4a) to form with said shoulders front recesses for the reception of the welding material 9. Welding material may also be applied to the rear and lower portions of the blade as indicated at 10 and 11. It will be apparent that the blades 7 and 8 project laterally beyond the bearing projections and form therewith rear side recesses for the reception of the welding material 10; and that the blades 7 and 8 also project downwardly beyond said projections and form therewith rear bottom recesses for the welding material 11.

Vertically elongated and leading from the longitudinal bore 12 through the shoulders 5 and 6 are slush passageways 13 and 14 to discharge the slush outwardly and downwardly in a sheet upon the blades 7 and 8. As indicated at 9a, the welding material 9 may be recessed adjacent the passageway 14 to permit the discharge of the slush.

The various advantages of this invention will be apparent to those skilled in the art. To assemble the parts it is necessary only to place the blades 7 and 8 upon the projections 3 and 4 and against the shoulders 5 and 6, apply the welding material 9, 10, and 11, and recess the welding material 9 as indicated at 9a. After the blades 7 and 8 have become worn and it is desired to replace them with new blades, it is necessary only to apply a blow torch to the welding material 9, 10, and 11 and to melt it, whereupon the blades 7 and 8 may be removed from the head.

The embodiment just described is adapted for use in taking cores with a core barrel such as that shown at 20.

Figure 4:
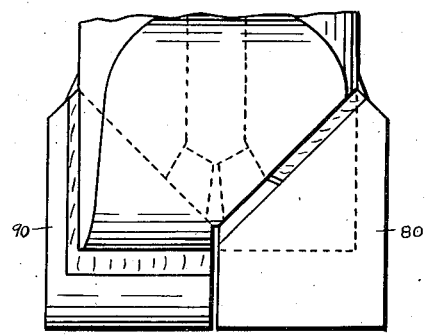

The embodiment shown in Fig. 4 is practically the same as that shown in Figs. 1, 2, and 3, except that the cutting blades 70 and 80 are extended inwardly so that the blades traverse the entire area of the bottom of the hole and no core is taken.

It will be understood that the invention is not limited to bits having two oppositely disposed cutting blades, but may be embodied in bits having three or more blades.

I claim:

1. A drill bit having a head, said head having a longitudinal bore, oppositely disposed depending bearing projections, and shoulders extending adjacent said projections upwardly and outwardly substantially from the longitudinal axis of said head to the periphery of said head; fish tail cutting blades bearing on said projections and against said shoulders, and projecting laterally and downwardly beyond said projections; the inner, front portions of said blades adjacent said shoulders being beveled to form with said shoulders front recesses for the reception of welding material; and welding material in said front recesses and in the rear recesses defined by the said projection of said blades beyond said bearing projections; said head having vertically elongated slush passageways leading from said longitudinal bore through said shoulders to direct slush downwardly and outwardly upon said blades, said welding material being recessed near the outlet of said passageways to permit the discharge of said slush.

2. A drill bit having a head, said head having a longitudinal bore, oppositely disposed depending bearing projections, and shoulders extending adjacent said projections upwardly and outwardly substantially from the longitudinal axis of said head to the periphery of said head; fish tail cutting blades bearing on said projections and against said shoulders, and projecting laterally and downwardly beyond said projections; the inner, front portions of said blades adjacent said shoulders being beveled to form with said shoulders front recesses for the reception of welding material; and welding material in said front recesses and in the rear recesses defined by the said projection of said blades beyond said bearing projections; said head having vertically elongated slush passageways leading from said longitudinal bore through said shoulders to direct slush downwardly and outwardly upon said blades.

3. A drill bit having a head, said head having oppositely disposed depending bearing projections, and shoulders extending adjacent said projections upwardly and outwardly substantially from the longitudinal axis of said head to the periphery of said head; fish tail cutting blades bearing on said projections and against said shoulders, and projecting laterally and downwardly beyond said projections; the inner, front portions of said blades adjacent said shoulders being beveled to form with said shoulders front recesses for the reception of welding material; and welding material in said front recesses and in the rear recesses defined by the said projection of said blades beyond said bearing projections; said head having slush passageways to direct slush downwardly and outwardly upon said blades.

GEORGE G. HARRINGTON.